United States Patent
Ho et al.

(10) Patent No.: US 6,438,429 B1
(45) Date of Patent: Aug. 20, 2002

(54) SENSING AUXILIARY POWER IN VARIOUS PERIPHERAL COMPONENT INTERCONNECT ENVIRONMENTS

(75) Inventors: Tan Thanh Ho, Santa Clara; Scott William Mitchell, San Jose; Andrew Nakao, Fremont; Ngo Thanh Ho, San Jose; George Kwan, Sunnyvale, all of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/454,796

(22) Filed: Dec. 3, 1999

(51) Int. Cl.[7] .................................................. G06F 1/26
(52) U.S. Cl. ........................................ 700/22; 713/340
(58) Field of Search .................. 700/22, 286; 713/300, 713/323, 330, 340; 710/101, 102, 129; 323/350

(56) References Cited

U.S. PATENT DOCUMENTS

| | | | |
|---|---|---|---|
| 5,630,142 A | * | 5/1997 | Crump et al. ................ 395/750 |
| 5,765,001 A | * | 6/1998 | Clark et al. ............ 395/750.08 |
| 6,065,122 A | * | 5/2000 | Wunderlich et al. ......... 713/320 |
| 6,092,208 A | * | 7/2000 | Reneris ....................... 713/323 |
| 6,189,108 B1 | * | 2/2001 | Cromer et al. ............... 713/340 |
| 6,256,744 B1 | * | 7/2001 | Simonich et al. ............ 713/340 |

* cited by examiner

Primary Examiner—Paul P. Gordon
(74) Attorney, Agent, or Firm—Wagner Murabito & Hao LLP

(57) ABSTRACT

A circuit and method thereof for indicating availability of a power source other than a first power source in a computer system peripheral device (such as a network adapter) connected to a plurality of power sources including. The circuit includes a circuit subassembly coupled to the first power source and a second power source. The circuit subassembly conducts current from the first power source when power is not available from the second power source and otherwise conducts current from the second power source. A first component is coupled to the circuit subassembly and conducts current when the second power source is available; otherwise, it does not conduct current. A second component is coupled to the circuit subassembly and to the first component. The second component conducts current when the first component is conducting current and otherwise does not conduct current. An output lead is coupled to the second component, and the output lead provides a signal indicating the second power source is available.

23 Claims, 6 Drawing Sheets

SENSING AUXILIARY POWER IN VARIOUS PERIPHERAL COMPONENT INTERCONNECT ENVIRONMENTS

TECHNICAL FIELD

The present invention generally pertains to the field of computer networking. More particularly, the present invention pertains to power management in a network adapter with more than one power source, such as a network adapter equipped with remote wakeup capability.

BACKGROUND ART

A computer system's functionality is dramatically enhanced by coupling stand-alone computers together to form a computer network. In a computer network, users may readily exchange files, share information stored on a common database, pool resources, and communicate via e-mail and video teleconferencing. Another advantage of computer networks is that they can be accessed from remote locations via a modem or various other types of communication equipment.

One popular type of computer network is known as a local area network (LAN). LANs connect multiple computers together such that the users of the computers can access the same information and share data. Typically, in order to be connected to a LAN, a general purpose computer requires a peripheral device generally known as a network adapter or network interface card (NIC). Essentially, the NIC works with the operating system and central processing unit (CPU) of the host computer to control the flow of information over the LAN. NICs may also be used to connect a computer to the Internet.

Remote access to a computer network (e.g., a LAN) is facilitated by providing the capability to start or wake up a computer from a remote location. This feature is advantageous to a user desiring access to a computer from a remote location. This feature is also advantageous to a network administrator, allowing the administrator to perform, for example, maintenance activities on a computer system from a remote location.

A standard has been developed for allowing a networked computer which is in sleep mode to be awakened. More specifically, Advanced Micro Devices (AMD) of Santa Clara, Calif., has developed a technology referred to as the Magic Packet technology. In the Magic Packet technology, assuming, for example, that an Ethernet controller is running and communicating with the network, the computer's power management hardware or software puts the Ethernet controller into the Magic Packet mode prior to the system going to sleep. Once in the sleep mode, the computer will be awakened when a Magic Packet is detected. That is, incoming data will be monitored until the specific sequence comprising the Magic Packet is detected. The Magic Packet technology and the associated standard (generally referred to as the Wakeon LAN standard) are well known in the art.

Accordingly, some NICs are designed to detect a Magic Packet and to awaken the computer (or selected components within the computer) in response. These NICs are typically connected in a standard fashion to the computer (e.g., to the computer's motherboard) via a bus such as a PCI (peripheral component interconnect) bus. These NICs also are connected to the motherboard via a separate cable (e.g., a remote wakeup cable) for revision 2.1 of the PCI specification. Thus, NICs that provide a remote wakeup capability typically have a primary power source from the motherboard and an auxiliary power source from the. remote wakeup cable. When the computer is powered on and awake, power to the NIC is provided over the PCI bus from the primary power source, typically five volts (5V). When the computer system is in the sleep mode, power to the NIC is provided over the remote wakeup cable from the auxiliary power source, typically also 5V. Therefore, when a Magic Packet is received, the NIC will have power and hence the ability to wake up. The NIC also can then send a PME (power management event) signal via the remote wakeup cable to wake up the computer.

Because there are more than one power sources in a NIC with remote wakeup capability, there is a potential for a power contention issue. Various techniques can be used to address the potential for power contention. One technique utilizes a hardware design to implement a method wherein power from one source is selected (for example, the auxiliary power source) over the other source (for example, the primary power source) when power from both sources is available.

However, this prior art technique is problematic because it is not possible to differentiate between power from the primary power source and power from the auxiliary power source. For example, a NIC can include an application specific integrated circuit (ASIC) that is intended to perform different known functions and operations depending on whether it is receiving power from the primary power source or from the auxiliary power source. Hence, it is desirable for the ASIC to be able to differentiate between the primary power source or from the auxiliary power source. However, the prior art is problematic because these sources are both +5V, and so at the ASIC one source of power is not distinguishable from the other.

This problem is further aggravated by the introduction of revision 2.2 of the PCI specification ("PCI 2.2"). With PCI 2.2, the aforementioned PCI bus is required to provide another auxiliary power source in addition to the power sources described above. In accordance with PCI 2.2, pin A14 of the PCI bus provides a 3.3V auxiliary power source to the NIC. Thus, a NIC with the remote wakeup capability and compliant with PCI 2.2 can have three power sources, aggravating the issue described above with regard to the ASIC (or other effected components) being able to distinguish one power source from another.

Thus, a need exists for a device or method that identifies when an auxiliary power source (such as an auxiliary power source associated with a remote wakeup function or an auxiliary power source associated with PCI 2.2) is available. A further need exists for a device or method that addresses the above need and provides the capability to differentiate between a primary power source (e.g., +5V over a bus) and an auxiliary power source (e.g., +5V over a remote wakeup cable). The present invention provides a novel solution to these needs.

DISCLOSURE OF THE INVENTION

The present invention provides a device and method thereof that identify when an auxiliary power source (such as an auxiliary power source associated with a remote wakeup function or an auxiliary power source associated with PCI specification revision 2.2) is available. The present invention also provides a device and method thereof that differentiate between a primary power source (e.g., +5V over a bus) and an auxiliary power source (e.g., +5V over a remote wakeup cable).

Specifically, in one embodiment of the present invention, the circuit and method thereof indicate availability of a power source other than a first power source (e.g., the primary power source) in a computer system peripheral device (such as a network adapter) connected to a plurality of power sources (e.g., one or more auxiliary power sources in addition to the primary power source). The circuit includes a circuit subassembly coupled to the first (e.g., primary) power source and a second (e.g., auxiliary) power source. The circuit subassembly conducts current from the first power source when power is not available from the second power source and otherwise conducts current from the second power source. A first component is coupled to the circuit subassembly and conducts current when the second power source is available; otherwise, it does not conduct current. A second component is coupled to the circuit subassembly and to the first component. The second component conducts current when the first component is conducting current and otherwise does not conduct current. An output lead is coupled to the second component, and the output lead provides a signal indicating the second power source is available.

In one embodiment, the signal consists of the presence of a voltage applied to the output lead, indicating the second power source is available.

In the present embodiment, a third component is connected to the circuit subassembly. The third component conducts current when the first component is not conducting current.

In the present embodiment, the first component is a diode and the second and third components are field effect transistors (FETs).

In one embodiment, a fourth component is coupled between the first (e.g., primary) power source and the second (e.g., auxiliary) power source. The fourth component conducts current from the first power source when power is not available from the second power source. Intrinsic to the fourth component is a fifth component adapted to conduct current from the first power source in combination with the fourth component and substantially prevents current from flowing from the second power source to the first power source. In the present embodiment, the fourth component is a FET and the fifth component is a diode. Thus, in this embodiment, power from the second power source is used when power is available from the second power source, and otherwise power from the first power source is used.

In one embodiment, a third power source is coupled to the output lead.

In one embodiment, the first power source is a five volt (5V) source connected to the peripheral device via a peripheral component interconnect (PCI) bus, the second power source is an auxiliary 5V source connected to the peripheral device via a remote wakeup cable, and the third power source is an auxiliary 3.3V source connected to the peripheral device in accordance with PCI specification revision 2.2.

Thus, the present invention provides a circuit and method thereof for indicating availability of a power source other than the first power source (for example, the availability of an auxiliary power source in addition to or in lieu of a primary power source). The present invention also provides a circuit and method thereof that differentiate between, for example, a 5V primary power source and a 5V auxiliary power source.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
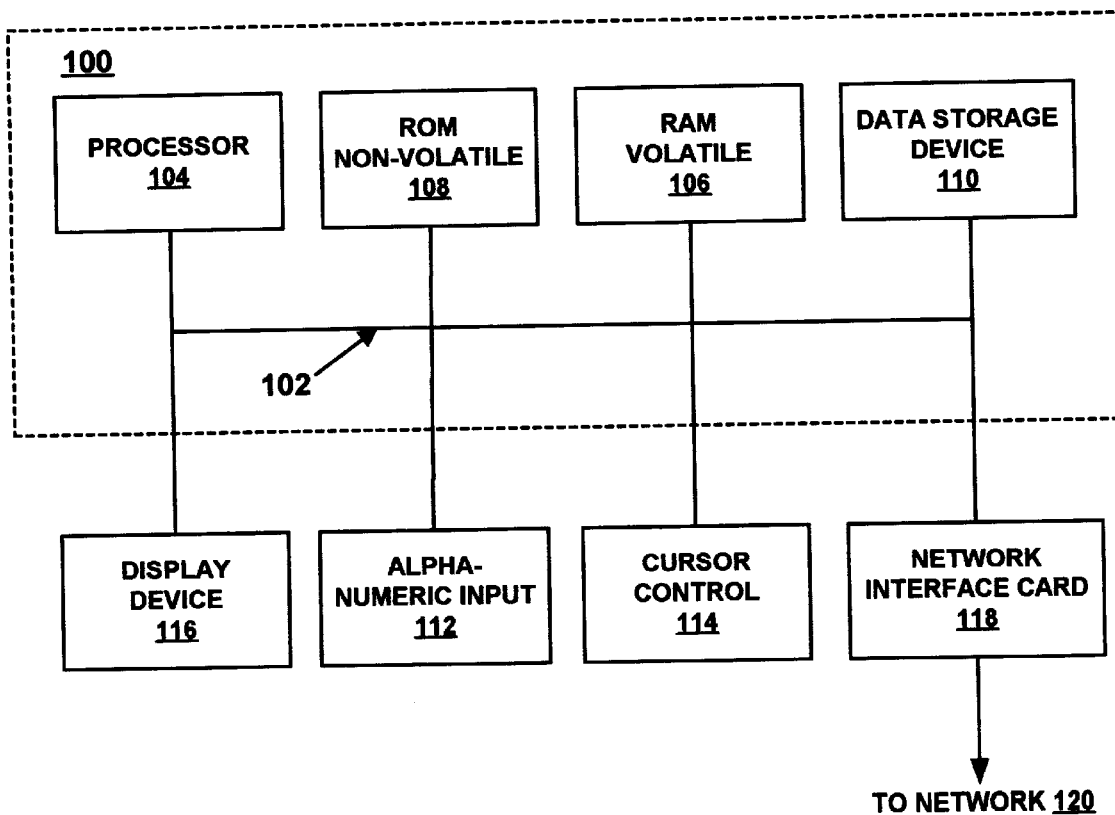
FIG. 1 is a block diagram of an exemplary computer system in accordance with one embodiment of the present invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "selecting," "conducting," "using," "detecting" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

FIG. 1 illustrates an exemplary computer system 100 upon which embodiments of the present invention may be implemented. The computer system 100 is used in combination with a peripheral component to perform the present method in accordance with one embodiment of the present invention. It is appreciated that system 100 is exemplary only and that the present invention can operate within a number of different computer systems including general purpose networked computer systems, embedded computer systems, and stand alone computer systems. Additionally, computer system 100 is well adapted to having computer readable media such as, for example, a floppy disk, a compact disc, and the like coupled thereto. Such computer readable media is not shown coupled to computer system 100 in FIG. 1 for purposes of clarity.

Computer system 100 includes an address/data bus 102 for communicating information. In the present embodiment, bus 102 is a PCI (peripheral component interconnect) bus compliant with revisions 2.1 and 2.2 of the PCI specification. Accordingly, the discussion herein is in the context of a PCI bus; however, it is appreciated that various other types of buses can be used in accordance with the present invention. It is also appreciated that other revisions of the PCI specification may be utilized in accordance with the present invention. Additional information regarding bus 102 is provided below in conjunction with FIG. 3.

Continuing with reference to FIG. 1, central processor unit 104 is coupled to bus 102 for processing information and instructions. Computer system 100 can also include data storage features such as a computer usable volatile memory 106 (e.g., random access memory [RAM]) coupled to bus 102 for storing information and instructions for central processor unit 104, computer usable non-volatile memory 108 (e.g. read only memory [ROM]) coupled to bus 102 for storing static information and instructions for the central processor unit 104, and a data storage device 110 (e.g., a magnetic or optical disk and disk drive) coupled to bus 102 for storing information and instructions. Computer system 100 can also include an optional alphanumeric input device 112 including alphanumeric and function keys. Alphanumeric input device 112 is coupled to bus 102 for communicating information and command selections to central processor unit 104. Computer system 100 can also optionally include a cursor control device 114 coupled to bus 102 for communicating user input information and command selections to central processor unit 104. Computer system 100 also can include an optional display device 116 coupled to bus 102 for displaying information.

Optional display device 116 may be a liquid crystal device, cathode ray tube, or other display device suitable for creating graphic images and alphanumeric characters recognizable to a user. Optional cursor control device 114 allows the computer user to dynamically signal the two-dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well-suited to directing a cursor by other means such as, for example, voice commands.

With reference still to FIG. 1, significantly, a network interface card (NIC) 118 coupled to bus 102 is connected to a network 120 and controls the flow of information to and from NIC 118 over network 120. Incoming data packets arrive at NIC 118 via network 120 and are typically stored in memory of NIC 118 before being transferred to other hardware and software of computer system 100. In accordance with the present invention, NIC 118 is equipped with a remote wakeup function. Various known remote wakeup techniques may be used in accordance with the present invention. One such remote wakeup technique is the known Magic Packet technique utilizing the Wakeon LAN (local area network) standard. A more detailed discussion of NIC 118 in furtherance of the present invention is found below.

Figure 2:
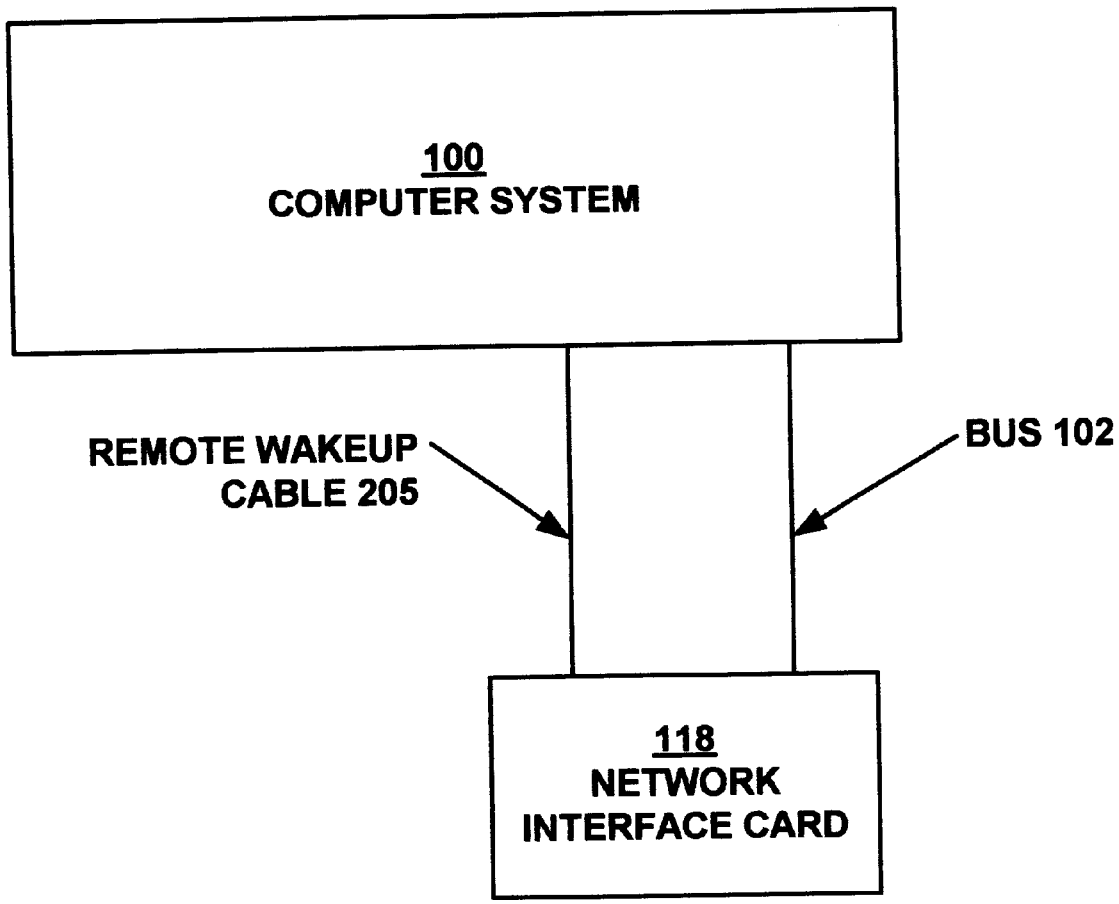
FIG. 2 is a block diagram showing a network interface card with remote wakeup capability connected to the computer system of FIG. 1 in accordance with one embodiment of the present invention.

Refer next to FIG. 2, which is a block diagram showing NIC 118 (with remote wakeup capability) connected to computer system 100 in accordance with the present embodiment of the present invention. NIC 118 is coupled to computer system 100 via bus 102 as described above. In one embodiment in which NIC 118 has remote wakeup capability, NIC 118 is also coupled to computer system 100 via remote wakeup cable 205.

In the present embodiment, bus 102 provides five volts (+5V) of power to NIC 118; in the discussion herein, this power is referred to as "primary power" or "+5V primary." The primary power is used to power NIC 118 when, for example, computer system 100 is powered on and not in the sleep mode, or when remote wakeup cable 205 is not attached.

When the remote wakeup function is present, +5V is also provided to NIC 118 using remote wakeup cable 205; in the discussion herein, this is referred to as "first auxiliary power" or "+5V auxiliary." The first auxiliary power is used to power NIC 118 when it is available. In other words, +5V auxiliary power supersedes the +5V primary power, and continues to be available when computer system 100 is in the sleep mode. In this manner, power remains available to NIC 118 so that it has the capability to wake up upon receiving a particular signal (e.g., a Magic Packet).

In the present embodiment, auxiliary power of +3.3V is also provided to NIC 118 via bus 102. For example, revision 2.2 of the PCI specification requires additional auxiliary power of +3.3V via pin A14 of bus 102. In the discussion herein, this is referred to as "second auxiliary power" or "+3.3V auxiliary." The +3.3V auxiliary power is not used if the +5V auxiliary power provided by the remote wakeup cable is available; that is, +3.3V auxiliary power is only used when computer system 100 is powered down without +5V auxiliary power.

In summary, in the present embodiment, NIC 118 has multiple power sources: for bus 102 compliant with revision 2.1 of the PCI specification ("PCI 2.1"), NIC 118 (with remote wakeup capability) has at least two (2) power sources, and for bus 102 compliant with revision 2.2 of the PCI specification, NIC 118 (with remote wakeup capability) has three (3) power sources. It is appreciated that additional power sources, or power sources of different voltages, may be utilized in accordance with the present invention. It is further appreciated that the present invention may be used when the remote wakeup cable is not present for PCI 2.1 or when the system is not compliant with revision 2.2 of the PCI specification, as will be seen. Thus, the present invention can be utilized with legacy devices.

Figure 3:
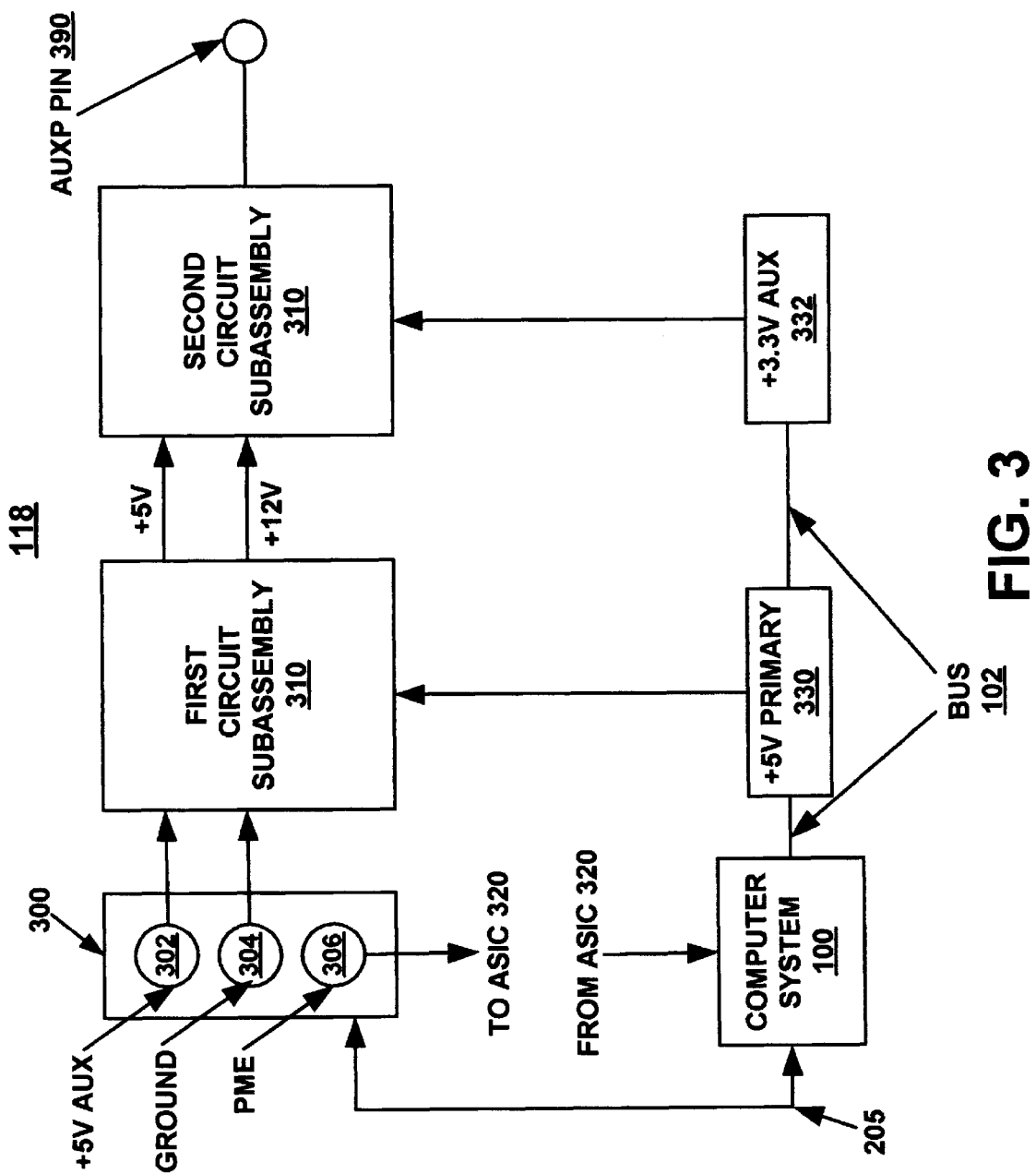
FIG. 3 is a block diagram of the network interface of FIG. 2 in accordance with one embodiment of the present invention.

FIG. 3 is a block diagram providing further details of NIC 118 in accordance with the present embodiment of the present invention. As described above, +5V primary power (330) and +3.3V auxiliary power (332) are provided to NIC 118 from computer system 100 via bus 102 for a system compliant with revision 2.2 of the PCI specification.

Also as described above, power for the remote wakeup function is provided to NIC 118 via remote wakeup cable 205. Remote wakeup cable 205 is connected to NIC 118 using connector 300. In the present embodiment, connector 300 is a 3-pin plug comprised of a first pin 302, a second pin 304 and a third pin 306. In this embodiment, first pin 302 provides +5V auxiliary power to NIC 118. Second pin 304 is a ground, and third pin 306 provides a power management event (PME) signal that is used to wake up computer system 100.

In accordance with the present invention, NIC 118 also includes first circuit subassembly 310 and second circuit subassembly 312. First circuit subassembly 310 is used to arbitrate between the +5V primary power 330 and +5V auxiliary power 302. Second circuit subassembly 312 is used to determine whether auxiliary power (either +3.3V auxiliary power 332 or +5V auxiliary power 302) is present in accordance with the present invention. If either +3.3V auxiliary power 332 or +5V auxiliary power 302 is present, then AUXP pin 390 receives a signal that indicates the availability of auxiliary power; additional information regarding the signal is provided in conjunction with FIG. 5. It is not necessary to identify the source of the auxiliary power; it is necessary only to identify the availability of auxiliary power to AUXP pin 390. First circuit subassembly 310 and second circuit subassembly 312 are described below in conjunction with FIG. 4 and FIG. 5, respectively.

Figure 4:
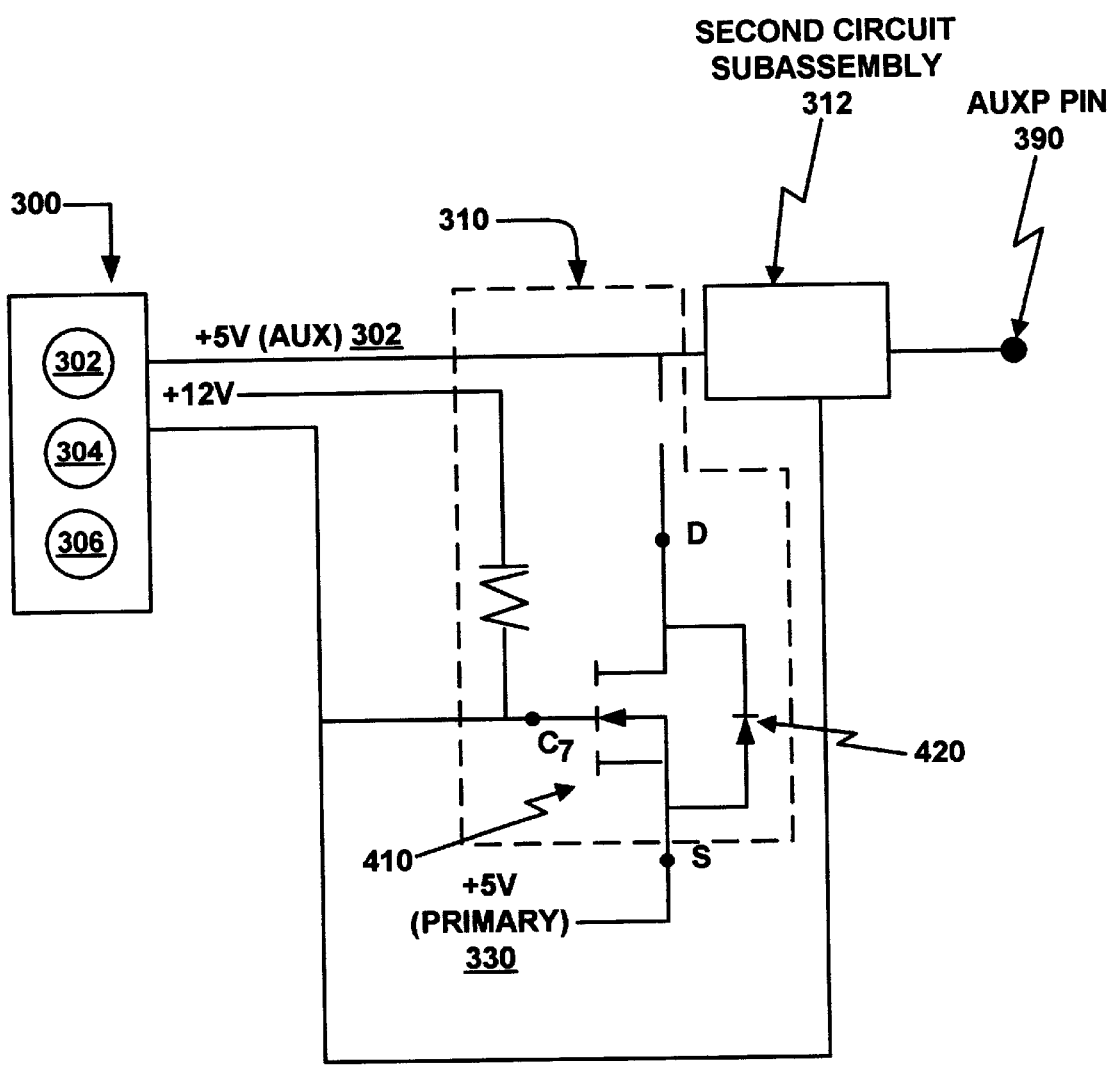
FIG. 4 is a schematic diagram of a first circuit subassembly used by the network interface card of FIG. 3 in accordance with one embodiment of the present invention.

FIG. 4 is a schematic diagram illustrating first circuit subassembly 310 in accordance with one embodiment of the present invention. First circuit subassembly 310 receives either +5V primary power 330 from bus 102 (FIG. 3) or +5V auxiliary power 302 from remote wakeup cable 205 (FIG. 3). In accordance with the present invention, first circuit subassembly 310 passes power from one source or the other but not both to second circuit subassembly 312. In the present embodiment, first circuit subassembly 310 conducts the power from +5V auxiliary power 302 when that source of power is available (e.g., when NIC 118 has the remote wakeup function) even when +5V primary power 330 is available. If +5V auxiliary power 302 is not available (e.g., NIC 118 does not have the remote wakeup function), then +5V primary power 330 is used (when computer system 100 is powered on and not in the sleep mode).

Continuing with reference to FIG. 4, first circuit subassembly 310 includes a component (410) that conducts power (e.g., current) from +5V primary power 330 when +5V auxiliary power 302 is not present. In the present embodiment, component 410 is a transistor, specifically a n-channel field effect transistor (FET) (hereinafter, n-channel FET 410). Intrinsic to n-channel FET 410 is a diode 420. The orientation of n-channel FET 410 allows the intrinsic diode 420 to substantially prevent power (current) from flowing from +5V auxiliary power 302 (when present) to +5V primary power 330. In the present embodiment, n-channel FET 410 is designed such that when $V_{GS}$ is greater than or equal to +5V, then n-channel FET 410 is on; otherwise, it is off. It is appreciated that n-channel FET 410 can be designed to be on/off for other values of $V_{GS}$ in accordance with the present invention.

In accordance with the present embodiment of the present invention, first circuit subassembly 310 works as follows. In the case in which both +5V auxiliary power 302 and +5V primary power 330 are present, NIC 118 will have remote wakeup capability and, accordingly, connector 300 including second pin 304 (ground) is also present. Thus, the +12V source (from bus 102) is grounded and $V_{GS}$ is −5V (0 V at the gate [G] terminal and +5V at the source [S] terminal of n-channel FET 410). Consequently, n-channel FET 410 is off and power from +5V auxiliary power 302 is sent to second circuit subassembly 312. Diode 420 intrinsic to n-channel FET 410 protects +5V primary power 330 against back drive current from +5V auxiliary power 302.

In the case in which computer system 100 (FIG. 3) is powered down (e.g., the computer system is in the sleep mode), then only +5V auxiliary power 302 is available. Diode 420 intrinsic to n-channel FET 410 protects +5V primary power 330 against back drive current from +5V auxiliary power 302.

In the case in which only +5V primary power 330 is present, NIC 118 does not have remote wakeup capability, and so connector 300 including second pin 304 (ground) is not present. Thus, $V_{GS}$ is +7V and consequently n-channel FET 410 is on. Power from +5V primary power 330 is then provided to second circuit subassembly 312. In this manner, the present invention can be implemented with legacy devices not equipped with the remote wakeup function.

In summary, in the present embodiment of the present invention, first circuit subassembly 310 gives precedence to +5V auxiliary power 302 when that source of power is available, and otherwise uses power from +5V primary power 330 when that source of power is available. However, it is appreciated in accordance with the present invention a different order may be utilized when assigning one power source precedence over another.

Figure 5:
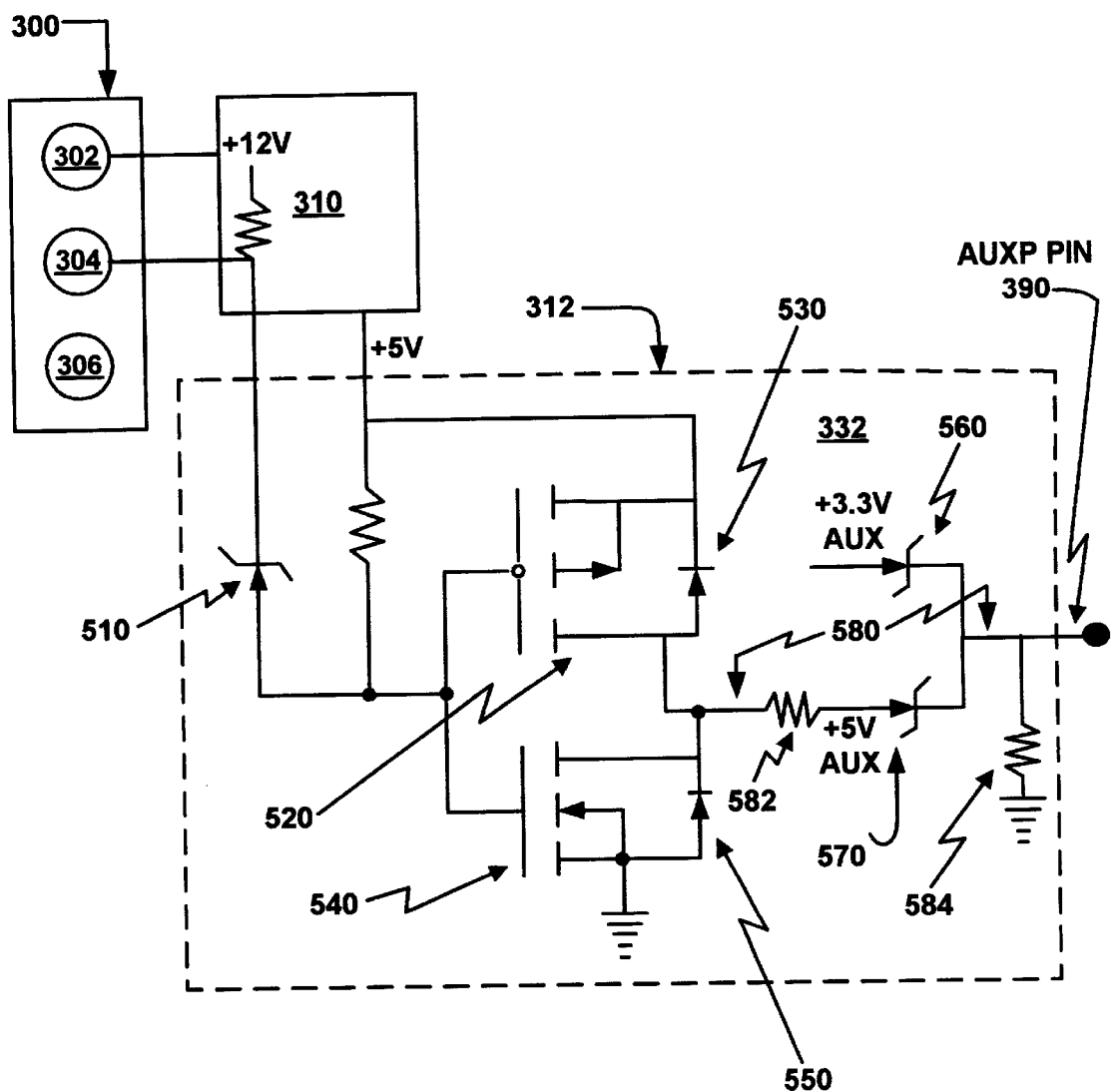
FIG. 5 is a schematic diagram of a second circuit subassembly used by the network interface card of FIG. 3 in accordance with one embodiment of the present invention.

FIG. 5 is a schematic diagram illustrating second circuit subassembly 312 in accordance with one embodiment of the present invention. As described above in conjunction with FIG. 4, first circuit subassembly 310 provides +5V (from either +5V auxiliary power 302 or from +5V primary power 330) to second circuit subassembly 312. In accordance with the present embodiment of the present invention, as will be seen from the discussion below, second circuit subassembly 312 can be used to differentiate between these two +5V power sources, thereby providing the capability to identify whether +5V auxiliary power 302 is available in addition to or in lieu of +5V primary power 330. In addition, as will be seen from the discussion below, the present embodiment of the present invention also provides the capability to identify whether +3.3V auxiliary power 332 is available.

Continuing with reference to FIG. 5, second circuit subassembly 312 includes a component (510) that will conduct power (e.g., current) when +5V auxiliary power 302 is present. In the present embodiment, this component is a diode; in a preferred embodiment, diode 510 is a Schottky diode. Second circuit subassembly 312 also includes a component (520) that conducts power when diode 510 conducts power; that is, when auxiliary power 302 is present. In the present embodiment, component 520 is a transistor, specifically a p-channel field effect transistor (FET) (hereinafter, p-channel FET 520). Intrinsic to p-channel FET 520 is diode 530.

Second circuit assembly 312 further includes a component (540) that will conduct power when +5V auxiliary power 302 is not present; that is, when diode 510 does not conduct power. In the present embodiment, this component is a transistor, specifically a n-channel FET (hereinafter, n-channel FET 540). Intrinsic to n-channel FET 540 is diode 550.

Taken as a whole, FET 520 and FET 540 function as an inverter when the orientation these FETs are oriented as indicated in FIG. 5.

Continuing with reference to FIG. 5, coupled to both p-channel FET 520 and n-channel FET 540 is an output lead 580. In the present embodiment, output lead 580 is coupled to AUXP pin 390. Output lead 580 includes diode 570 and a voltage divider coupled between AUXP pin 390 and the two FETs (e.g., p-channel FET 520 and n-channel FET 540). In a preferred embodiment, diode 570 is a Schottky diode. The voltage divider consists of resistor 582 and resistor 584. These two resistors are adjusted such that the voltage at output lead 580 will be approximately +3.3V.

For a system compliant with revision 2.2 of the PCI specification, +3.3V auxiliary power 332 is coupled to output lead 580 via diode 560. In a preferred embodiment, diode 560 is a Schottky diode. The use of Schottky diodes for diodes 560 and 570 reduces the voltage drop across these diodes, so that the voltage applied to output lead 580 does not fall too close to the lower limit associated with a logic value of "1" for a TTL (transistor-to-transistor logic) or CMOS (complementary metal-oxide semiconductor) input.

In one embodiment of the present invention, when either or both +5V auxiliary power 302 and +3.3V auxiliary power 332 are available, there will be voltage applied to output lead 580 that is detected by AUXP pin 390, indicating the availability of auxiliary power. However, it is appreciated that in accordance with the present invention, another type of signal can be used. For example, the voltage applied to output lead 580 can be used to generate voltages of various levels that can be used to indicate the availability of auxiliary power. Similarly, the voltage or current can be reduced to zero, so that the absence of a voltage or current at AUXP pin 390 indicates the unavailability of auxiliary power.

In one embodiment, AUXP pin 390 receives +3.3V when either +5V auxiliary power 302 or +3.3V auxiliary power 332 is available. In this embodiment, resistor 582 changes the amount of voltage from p-channel FET 520 so that after the current passes through diode 570, the voltage is approximately +3.3V.

In accordance with one embodiment of the present invention, second circuit subassembly 312 works as follows. In the case in which +5V primary power 330 is available but there is no auxiliary power (that is, neither +5V auxiliary power 302 nor +3.3V auxiliary power 332 is available), then the voltage at AUXP pin 390 will be zero. The +12V power source (from bus 102, FIG. 4) is present because connector 300 including second pin 304 (ground) is not connected. Thus, +12V exists on one side of diode 510 and +5V exists on the other side. Consequently, no current flows through diode 510. As a result, at p-channel FET 520, $V_{SG}$ is zero and so p-channel FET 520 is off. Accordingly, no current flows through p-channel FET 520. In addition, at n-channel FET 540, $V_{GS}$ is +5V, and n-channel FET 540 is therefore on. Consequently, any current is pulled to ground and there is no voltage applied to output lead 580. Thus, AUXP pin 390 does not detect a current in output lead 580, thereby indicating that no auxiliary power is available.

With reference still to FIG. 5, next consider the case in which only +3.3V auxiliary power 332 and +5V primary power 330 are available but +5V auxiliary power 302 is not available (for example, for a system compliant with PCI specification revision 2.2 but without a remote wakeup cable). In this case, second circuit subassembly 312 functions as described above. That is, there will be no voltage applied to output lead 580 attributable to +5V primary power 330 or +5V auxiliary power 302. However, there will be voltage applied to output lead 580 from +3.3V auxiliary power 332. Accordingly, AUXP pin 390 detects the voltage applied to output lead 580, indicating the availability of an auxiliary power source. In this case and in each of the cases discussed below, it is not necessary to identify the source of the auxiliary power; it is necessary only to identify the availability of auxiliary power to AUXP pin 390.

In a manner similar to above, in the case in which +5V primary power 330 and +5V auxiliary power 302 are not available (e.g., the computer system is powered down and there is no remote wakeup capability) but power from +3.3V auxiliary power 332 is available, no voltage will be applied to output lead 580 from +5V primary power 330 or +5V auxiliary power 302. However, there will be voltage applied to output lead 580 from +3.3V auxiliary power 332 in accordance with the present embodiment of the present invention. Accordingly, AUXP pin 390 detects the voltage applied to output lead 580, indicating the availability of an auxiliary power source.

Next, consider the case in which both +5V primary power 330 and +5V auxiliary power 302 are available and +3.3V auxiliary power 332 is not available (for example, a system with remote wakeup capability that is not compliant with PCI specification revision 2.2). As described above in conjunction with FIG. 4, first circuit subassembly 310 gives precedence to +5V auxiliary power 302 when both +5V primary power 330 and +5V auxiliary power 302 are available. Thus, in this case, the power received by second circuit subassembly 312 from first circuit subassembly 310 is attributable to +5V auxiliary power 302. With remote wakeup capability, connector 300 including second pin 304 (ground) is present. Consequently, the +12V source (from bus 102) flows to ground and there is current across diode 510. Accordingly, at p-channel FET 520, $V_{SG}$ is approximately +5V and so p-channel FET 520 is on ($V_{SG}$ is actually slightly less than +5V because there is a slight voltage drop associated with diode 510). However, at n-channel FET 540, $V_{GS}$ is negative or zero and so n-channel FET 540 is off. As a result, current flows from p-channel FET 520 through output lead 580 in accordance with the present embodiment of the present invention. In this case, the presence of voltage applied to output lead 580 indicates the availability of +5V auxiliary power 302. Accordingly, AUXP pin 390 detects the voltage applied to output lead 580, indicating the availability of an auxiliary power source. The voltage divider (resistors 582 and 584) ensures that the voltage at output lead 580 and AUXP pin 390 is approximately +3.3V.

The case in which only +5V auxiliary power 302 is available and +5V primary power 330 and +3.3V auxiliary power 332 are not available is similar to the case described in the preceding paragraph because, as described in conjunction with FIG. 4, when both +5V primary power 330 and +5V auxiliary power 302 are available, only +5V auxiliary power 302 is used. Thus, there will be voltage applied to output lead 580 indicating the availability of +5V auxiliary power 302 in accordance with the present embodiment of the present invention. Accordingly, AUXP pin 390 detects the voltage applied to output lead 580, indicating the availability of an auxiliary power source. The voltage divider (resistors 582 and 584) ensures that the voltage at output lead 580 and AUXP pin 390 is approximately +3.3V.

Similarly, when +5V primary power 330, +5V auxiliary power 302 and +3.3V auxiliary power 332 are all available, precedence is given to +5V auxiliary power 302 as described in conjunction with FIG. 4. Thus, in accordance with the present embodiment of the present invention, there will be voltage applied to output lead 580, indicating the availability of both +5V auxiliary power 302 and +3.3V auxiliary power 332. Likewise, when only +5V auxiliary power 302 and +3.3V auxiliary power 332 are available, there will be voltage applied to output lead 580, indicating the availability of both +5V auxiliary power 302 and +3.3V auxiliary power 332. There is no power contention between the +5V auxiliary voltage and the +3.3V auxiliary voltage because diodes 570 and 560, respectively, provide voltage isolation.

Figure 6:
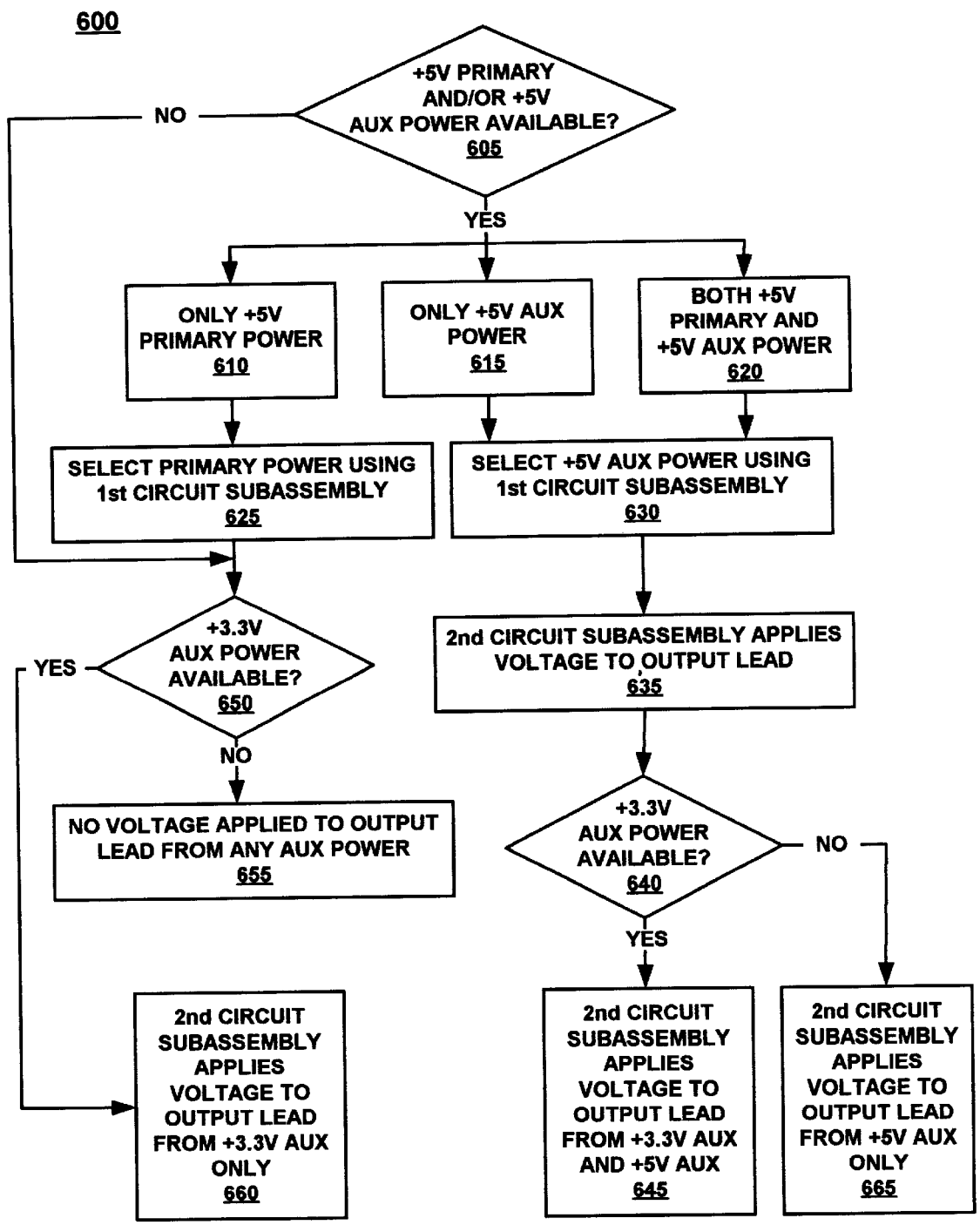
FIG. 6 is a flowchart of a process used to sense the availability of auxiliary power in accordance with one embodiment of the present invention.

FIG. 6 is a flowchart of process 600 used to sense the availability of one or more auxiliary power sources connected to NIC 118 (FIG. 3) in accordance with one embodiment of the present invention. Process 600 can be implemented for devices (e.g., NIC 118) with or without remote wakeup capability and for devices that are or are not compliant with PCI specification revision 2.2. Thus, process 600 can be utilized with legacy devices.

Starting with step 605 of FIG. 6, in accordance with the present embodiment, power will be selectively conducted from either +5V primary power 330 (FIG. 3) or +5V auxiliary power 302 (FIG. 3).

In step 610 of FIG. 6, only +5V primary power 330 is available. In this case, NIC 118 does not have the remote wakeup function through cable 205 (FIG. 3) or, alternatively, cable 205 is not connected to connector 300 of FIG. 3.

In step 615 of FIG. 6, only +5V auxiliary power 302 is available. In this case, computer system 100 of FIG. 3 can be powered down and placed in sleep mode.

In step 620 of FIG. 6, both +5V primary power 330 and +5V auxiliary power 302 are available.

In step 625, from step 610, first circuit assembly 310 (FIG. 3) provides +5V primary power 330 to second circuit subassembly 312 as described above in conjunction with FIG. 4.

In step 630, from step 615 or 620, first circuit assembly 310 provides +5V auxiliary power 330 to second circuit subassembly 312 as described above in conjunction with FIG. 4 in accordance with one embodiment of the present invention.

In step 635, because +5V auxiliary power 330 is available, second circuit assembly 312 functions as described above in conjunction with FIG. 5. Thus, a signal is received at AUXP pin 390 (FIG. 5) to indicate the availability of auxiliary power. In one embodiment, the signal consists of voltage that is applied to output lead 580 (FIG. 5) to indicate an auxiliary power source is available.

In step 640, depending on whether the device (e.g., NIC 118) is compliant with revision 2.2 of the PCI specification, +3.3V auxiliary power 332 may also be available. Step 640 depends on the cases in which +5V auxiliary power 302 is available.

In step 645, if +3.3V auxiliary power 332 is available in addition to +5V auxiliary power 302, then another signal is received by AUXP pin 390 via +3.3V auxiliary power 332. Both +5V auxiliary power 302 and +3.3V auxiliary power 332 apply a voltage to output lead 580 to indicate an auxiliary power source is available as described in conjunction with FIG. 5. In this embodiment, if +3.3V auxiliary power 332 is not available, then voltage is applied to output lead 580 through +5V auxiliary power 302 only (step 665).

In step 650, from step 625, depending on whether the device (e.g., NIC 118) is compliant with revision 2.2 of the PCI specification, +3.3V auxiliary power 332 may also be available. Step 650 depends on the cases in which +5V auxiliary power 302 is not available.

In step 655, if +3.3V auxiliary power 332 is not available, then no voltage is applied to output lead 580. If +3.3V auxiliary power 332 is available, then a signal is received by AUXP pin 390 via +3.3V auxiliary power 332 (step 660). In one embodiment, a voltage is applied to output lead 580 from second circuit subassembly 312 to indicate an auxiliary power source is available as described in conjunction with FIG. 5.

In summary, the present embodiment of the present invention provides a device and method thereof that identify when an auxiliary power source (such as an auxiliary power source associated with a remote wakeup function or an auxiliary power source associated with PCI specification revision 2.2) is available in addition to a primary power source. The present embodiment of the present invention also provides a device and method thereof that differentiate between a primary power source (e.g., +5V over a bus) and an auxiliary power source (e.g., +5V auxiliary over a remote wakeup cable). The present embodiment of the present invention can be used with devices that have the remote wakeup function and also with devices that are compliant with revision 2.2 of the PCI specification. However, the present invention can also be used with legacy devices that do not have the remote wakeup function or are not compliant with revision 2.2 of the PCI specification. In other embodiments, the present invention can be used with different numbers of power sources having different voltages than those discussed herein.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications suited to the particular use contemplated. It is intended that the scope of the invention be defined by the Claims appended hereto and their equivalents.

What is claimed is:

1. In a computer system peripheral device connected to a plurality of power sources including a first power source and a second power source, a circuit for indicating availability of a power source other than said first power source, said circuit comprising:

a circuit subassembly coupled to said first power source and said second power source, said circuit subassembly adapted to conduct current from said first power source when power is not available from said second power source and otherwise conduct current from said second power source;

a first component coupled to said circuit subassembly, said first component adapted to conduct current when said second power source is available and to not substantially conduct current otherwise;

a second component coupled to said circuit subassembly and to said first component, said second component adapted to conduct current when said first component is conducting current and to not substantially conduct current otherwise; and an output lead coupled to said second component, wherein said output lead provides a signal indicating said second power source is available.

2. The circuit of claim 1 further comprising:

a third component coupled to said circuit subassembly, said third component adapted to conduct current when said first component is not conducting current.

3. The circuit of claim 2 wherein said second component and said third component are field effect transistors.

4. The circuit of claim 1 wherein said first component is a diode.

5. The circuit of claim 1 wherein said circuit subassembly comprises:

a fourth component coupled between said first power source and said second power source, said fourth component adapted to conduct current from said first power source when said second power source is not available and to otherwise conduct power from said second power source; and a fifth component integral with said fourth component, wherein said fifth component is adapted to conduct current from said first power source in combination with said fourth component and to substantially prevent current from flowing from said second power source to said first power source.

6. The circuit of claim 5 wherein said fourth component is a transistor and said fifth component is a diode.

7. The circuit of claim 1 wherein said first power source is connected to said peripheral device via a PCI (peripheral component interconnect) bus and said second power source is connected to said peripheral device via a cable that provides a remote wakeup function.

8. The circuit of claim 1 further comprising:

a third power source coupled to said output lead, wherein said signal indicates said third power source is available.

9. The circuit of claim 8 wherein said third power source is connected to said peripheral device via a PCI bus in accordance with PCI standard 2.2.

10. The circuit of claim 1 wherein said peripheral device is a network adapter.

11. In a computer system peripheral device connected to a plurality of power sources including a first power source and a second power source, a method for indicating availability of a power source other than said first power source, said method comprising the steps of:

a) selectively conducting current from said first power source when power is not available from said second power source and otherwise conducting current from said second power source using a circuit subassembly coupled to said first power source and said second power source;

b) using a first component to conduct current when said second power source is available, said first component otherwise not substantially conducting current;

c) using a second component to conduct current when said first component is conducting current, said second component otherwise not substantially conducting current; and d) using an output lead to provide a signal indicating said second power source is available.

12. The method for indicating availability of a power source as recited in claim 11 further comprising the step of:

using a third component to conduct current when said first component is not conducting current.

13. The method for indicating availability of a power source as recited in claim 12 wherein said second component and said third component are field effect transistors.

14. The method for indicating availability of a power source as recited in claim 11 wherein said first component is a diode.

15. The method for indicating availability of a power source as recited in claim 11 wherein step a) further comprises the steps of:

a1) selectively conducting current from said first power source using a fourth component coupled between said first power source and said second power source; and a2) conducting current from said first power source and substantially preventing current from flowing from said second power source to said first power source using a fifth component integral with said fourth component;

wherein power from said second power source is conducted when power is available from said second power source, and otherwise power from said first power source is conducted.

16. The method for indicating availability of a power source as recited in claim 15 wherein said fourth component is a transistor and said fifth component is a diode.

17. The method for indicating availability of a power source as recited in claim 11 wherein said first power source is connected to said peripheral device via a PCI (peripheral component interconnect) bus and said second power source is connected to said peripheral device via a cable that provides a remote wakeup function.

18. The method for indicating availability of a power source as recited in claim 11 further comprising the step of:

using said signal to indicate the availability of a third power source coupled to said output lead.

19. The method for indicating availability of a power source as recited in claim 18 wherein said third power source is connected to said peripheral device via a PCI bus in accordance with PCI standard 2.2.

20. The method for indicating availability of a power source as recited in claim 11 wherein said peripheral device is a network adapter.

21. In a computer system peripheral device connected to a first power source, a second power source and a third power source, a circuit for indicating availability of a power source other than said first power source, said circuit comprising:

a first circuit subassembly coupled to said first power source and said second power source, said first circuit subassembly comprising:

a first transistor coupled between said first power source and said second power source, said first transistor adapted to conduct current from said first power source; and a first diode integral with said first transistor, wherein said first diode is adapted to conduct current from said first power source in combination with said first transistor and to substantially prevent current from flowing from said second power source to said first power source;

wherein said first circuit subassembly conducts power from said second power source when power is available from said second power source and otherwise conducts power from said first power source; and a second circuit subassembly coupled to said first circuit subassembly and said third power source, said second circuit assembly comprising:

a second diode coupled to said first circuit subassembly, wherein said second diode is adapted to conduct current when said second power source is available and to not substantially conduct current otherwise;

a second transistor coupled to said first circuit subassembly and to said second diode, wherein said second transistor is adapted to conduct current when said second diode is conducting current and to not substantially conduct current otherwise; and an output lead coupled to said second transistor, wherein said third power source is coupled to said output lead;

wherein said output lead provides a signal indicating a power source other than said first power source is available.

22. The circuit of claim 21 wherein said first power source is connected to said peripheral device via a PCI (peripheral component interconnect) bus, said second power source is connected to said peripheral device via a cable that provides a remote wakeup function, and said third power source is connected to said peripheral device via a PCI bus in accordance with PCI standard 2.2.

23. The circuit of claim 21 wherein said peripheral device is a network adapter.

* * * * *